US008943179B2

United States Patent
Li et al.

(10) Patent No.: US 8,943,179 B2
(45) Date of Patent: *Jan. 27, 2015

(54) METHOD AND SYSTEM FOR GENERIC IP MULTIMEDIA RESIDENTIAL GATEWAYS

(71) Applicant: Broadcom Corporation, Irvine, CA (US)

(72) Inventors: Gordon Li, San Diego, CA (US); Xuemin Chen, Rancho Santa Fe, CA (US); John McQueen, Escondido, CA (US); Sam Anderson, Surrey (CA); Pierre Couillaud, Vancouver (CA); Richard Schwartz, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/891,712

(22) Filed: May 10, 2013

(65) Prior Publication Data

US 2013/0246591 A1 Sep. 19, 2013

Related U.S. Application Data

(63) Continuation of application No. 12/829,145, filed on Jul. 1, 2010, now Pat. No. 8,504,708.

(51) Int. Cl.
*G06F 15/177* (2006.01)
*H04L 12/24* (2006.01)
(Continued)

(52) U.S. Cl.
CPC .......... *H04L 41/0816* (2013.01); *H04L 12/281* (2013.01);
(Continued)

(58) Field of Classification Search
USPC ............................ 709/203, 223, 230, 221, 20
See application file for complete search history.

(56) References Cited

U.S. PATENT DOCUMENTS 7,881,338 B2 * 2/2011 Damola et al. ................ 370/466
(Continued)

OTHER PUBLICATIONS

Office Action for Chinese Patent Application No. 2013102300956910 mailed Oct. 28, 2013 (with English summary).

*Primary Examiner* — El Hadji Sall
(74) *Attorney, Agent, or Firm* — Foley & Lardner LLP; Christopher J. McKenna; Paul M. H. Pua

(57) ABSTRACT

A common IP layer client device interface within an IP multimedia gateway (IMG) is configured to connect client devices to broadband IP networks such as the Internet based on determined device capabilities. Broadband IP network interfaces within the IMG are configured to enable communication between the IMG and broadband IP networks based on the determined device capabilities. Content provided by various service managers are communicated with the client devices utilizing the common IP layer client device interface and the configured network interfaces. Network capabilities may be determined during the device and network discovery. Protocol translation, media transcoding and/or dynamic device configuration may be performed based on the determined device capabilities, and based on the determined network capabilities. The IMG may adjust system timing and manage power consumptions for service deployment over corresponding client devices. Information may be routed or distributed by the IMRG among the client devices when needed.

18 Claims, 7 Drawing Sheets

(51) Int. Cl.
*H04L 12/28* (2006.01)
*H04L 29/06* (2006.01)

(52) U.S. Cl.
CPC ....... *H04L 12/2834* (2013.01); *H04L 65/1026* (2013.01); *H04L 12/2898* (2013.01); *H04L 65/605* (2013.01)
USPC .......................................... 709/221; 709/200

(56) References Cited

U.S. PATENT DOCUMENTS

2005/0091359 A1\* 4/2005 Soin et al. ..................... 709/223
2005/0201386 A1\* 9/2005 Thompson ............... 370/395.52
2009/0028189 A1\* 1/2009 Kato et al. ..................... 370/476

\* cited by examiner

METHOD AND SYSTEM FOR GENERIC IP MULTIMEDIA RESIDENTIAL GATEWAYS

CROSS-REFERENCE TO RELATED APPLICATIONS/INCORPORATION BY REFERENCE

This application is a utility application that claims priority to co-pending U.S. patent application titled, "Method and System for Generic IP Multimedia Residential Gateways", having Ser. No. 12/829,145, filed Jul. 1, 2010, which is entirely incorporated herein by reference. This application makes reference to:

U.S. application Ser. No. 12/829,179 filed on Jul. 1, 2010,
U.S. application Ser. No. 12/829,212 filed on Jul. 1, 2010,
U.S. application Ser. No. 12/828,549 filed on Jul. 1, 2010,
U.S. application Ser. No. 12/828,652 filed on Jul. 1, 2010,
U.S. application Ser. No. 12/837,045 filed on Jul. 1, 2010,
U.S. application Ser. No. 12/837,052 filed on Jul. 1, 2010, and
U.S. application Ser. No. 12/837,089 filed on Jul. 1, 2010.

Each of the above stated applications is hereby incorporated herein by reference in its entirety.

FIELD OF THE INVENTION

Certain embodiments of the invention relate to communication systems. More specifically, certain embodiments of the invention relate to a method and system for generic IP multimedia residential gateways.

BACKGROUND OF THE INVENTION

Telecommunication technologies have evolved from analog to digital technologies, and continue to evolve from circuit switched to packet switched, from connection oriented packet switching to connectionless packet switching, and from narrowband application to broadband applications. The accompanied evolution in telecommunication technologies has significantly advanced operators' capability to offer broadband, IP-based multimedia services (IMS) ranging from entertainment and lifestyle applications such as mobile TV and mobile payment to professional services such as video conferencing and real-time data exchange.

IMS defines a standard framework for the deployment of next generation Web-based application services. IMS defines how these services connect and communicate with the underlying telecommunications network(s) and how they integrate with the network provider's back-end systems. IMS combines voice and data in one packet switched network such as, for example, the GPRS core network and the LTE core network, to offer network controlled multimedia services. Various Internet Protocols (IPs) such as the Session Initiation Protocol (SIP), the User Datagram Protocol (UDP), the Transmission Control Protocol (TCP) and Real-Time Transport Protocol (RTP) are widely utilized for delivery of various forms of multimedia applications over IP networks. SIP is an end-to-end application layer signaling protocol that is utilized to setup, modify, and teardown multimedia sessions such as audio/videoconferencing, interactive gaming, virtual reality, and call forwarding over IP networks. UDP and TCP are transport layer protocols that are used for data delivery over IP networks. TCP guarantees data delivery and integrity, however, UDP does not exclusively guarantee delivery of data. RTP is the Internet protocol which transports real-time data such as audio and video data. RTP does not exclusively guarantee real-time delivery of data, but it does provide mechanisms for the sending and receiving applications to support streaming and/or conversational data.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for generic IP multimedia residential gateways, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for generic IP multimedia residential gateways. In various embodiments of the invention, an IP multimedia gateway (IMG) may be operable to discover or determine various device capabilities such as device service processing capabilities of one or more of a plurality of client devices. A common IP layer client device interface within the IMG may be configured to enable communication between one or more of the plurality of client devices and one or more broadband IP networks, based on the corresponding determined or discovered device capabilities. The common IP layer client device interface within the IMG may comprise RTP and/or SIP. The one or more broadband IP networks may comprise a VoIP softswitch network, a multimedia content provider network, a cable provider network, a satellite provider network, an IP telephony network, and/or the Internet. One or more broadband IP network interfaces within the IMG may be configured to enable communication between the IMG and broadband IP networks based on the determined device capabilities such as specific communication standards supported. The IMG may utilize the common IP layer client device interface and the configured one or more network interfaces to communicate content of various IP based services between the one or more of the plurality of client devices and one or more service manager. The IMG may be operable to determine network capabilities of the broadband IP networks during the device and network discovery. In this regard, the IMG may be operable to perform protocol translation and/or content transcoding based on the determined device capabilities and the determined network capabilities. The IMG may dynamically configure the client devices based on the determined device capabilities and the determined network capabilities. The IMG may be operable to adjust system timing and perform power control, accordingly, to communicate or deploy services provided by the one or more service manager over corresponding client devices. Information such as media, signaling and event packets may be routed or distributed by the IMG among the plurality of client devices when needed.

Figure 1:
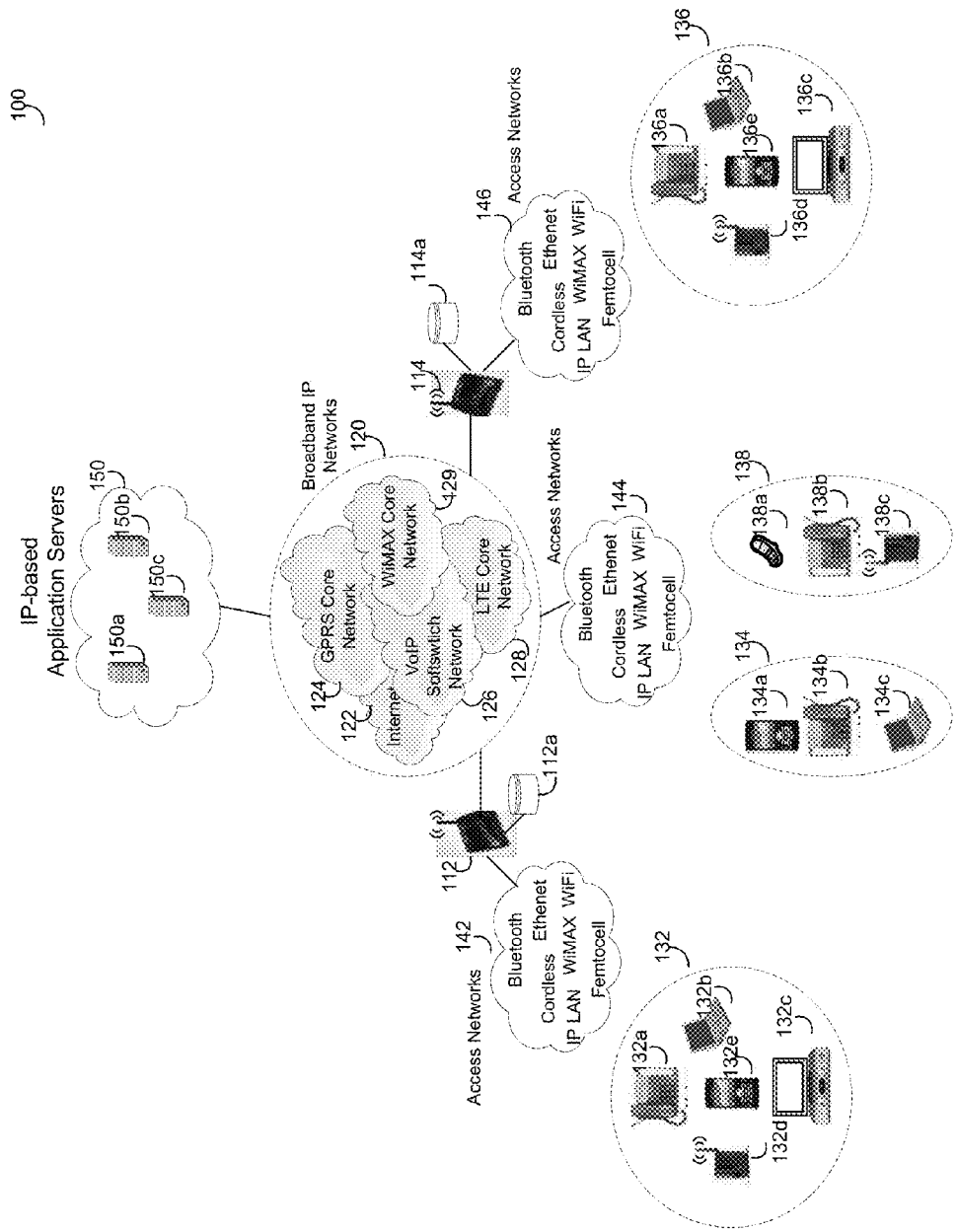
FIG. 1 is a diagram illustrating an exemplary communication system that is operable to utilize an IP multimedia residential gateway (IMRG) to connect client devices through a common IP layer interface to broadband IP networks via a configurable interface, in accordance with an embodiment of the invention.

FIG. 1 is a diagram illustrating an exemplary communication system that is operable to utilize an IP multimedia residential gateway (IMRG) to connect client devices through a common IP layer interface to broadband IP networks via a configurable interface, in accordance with an embodiment of the invention. Referring to FIG. 1, there is shown a communication system 100 comprising a plurality of IP multimedia residential gateways (IMRGs), of which IMRGs 112-114 are illustrated, broadband IP networks 120, a plurality of client devices 132a~132e, 134a~134c, 136a~136e, and 138a~138c, which are collectively referred to herein as client devices 132, 134, 136 and 138, respectively, a plurality of access networks 142~146, and IP-based application servers 150, of which service servers 150a~150c are displayed.

An IMRG such as the IMRG 112 may comprise suitable logic, circuitry, interfaces and/or code that are operable to connect the client devices 132a~132e to the broadband IP networks 120 for services of interest. A service may be described or represented by the service type and the service class. The type of a service refers to as the type of information to be transferred such as data, voice, text or radio for the service. A service with a given service type may be classified into a plurality of exemplary scheduling service classes, namely, data services for Internet access and messaging, conversational services for carrier-grade voice and/or video calls and conferences, video services for TV, video and music streaming, gaming services for users to interact with one another via a central server, and corporate VPN services for access to enterprise intranet/email. Specific requirements may be placed on access networks and core networks for each service type and/or class to ensure desired end-to-end QoS. The service requirements on access networks and core networks may comprise, for example, system timing, CODEC, transmission rates, power-saving mechanisms, security profiles and content types. The system timing may be utilized to synchronize communications for delivery of service. The CODEC may comprise G.711, G.729, G.723, MPEG-4, VC-1, and VP6, for example. The power-saving mechanisms may comprise various power levels, which may be utilized within certain time intervals, for service transmissions. The security profiles may comprise service security descriptions such as, for example, security configurations and policies. The security configuration of a service may comprise protocols, credentials, and actions such as authentication actions. The content type of a service may specify what type of content that the service may comprise. The content type for a service may comprise, for example, Multipart Internet Mail Extensions (MIME) files, HTML pages, H.262, H.263, H.264/AVC video, G.711, BV16, BV32 voice, and DOCSIS Set-top Gateway (DSG) multimedia.

In various exemplary embodiments of the invention, the IMRG 112 may be operable to integrate local client devices as well as remote client devices to the broadband IP networks 120. Client devices such as the client devices 132a-132e that may access the IMRG 112 via device-dependent interfaces are referred to as local client devices for the IMRG 112. A device-dependent interface may generally represent the PHY and MAC functionality of a particular access technology such as, for example, Ethernet, Wi-Fi, Bluetooth, cordless, and/or Femtocell. Client devices such as the client devices 134a-134c that may remotely access the IMRG 112 via device-independent interfaces such as the broadband IP networks 120 are referred to as remote client devices for the IMRG 112. Client devices such as the client devices 136a-136e that may remotely access the IMRG 112 via other IMRGs such as the IMRG 114 are also referred to as remote client devices for the IMRG 112.

In various exemplary embodiments of the invention, the IMRG 112 may be operable to perform automatic device and network discovery. In this regard, the IMRG 112 may be operable to utilize proprietary methods and/or well-known networking protocols such as UPnP and DHCP, or a combination of both to perform search, in the background or transparently, for attached client devices and broadband IP networks. For example, the IMRG 112 may be operable to multicast a discovery message. The IMRG 112 may discover or identify attached devices and/or networks from responses received to the discovery message. In this regard, the IMRG 112 may be operable to retrieve or determine, from the received responses, client device capabilities for the discovered devices, and/or network capabilities for the discovered networks. The client device capabilities may comprise interface types, processing protocols, service types, service classes and/or service requirements. The interface types for the identified device may comprise access interface types such as Multimedia over Coax Alliance (MoCa), WiFi, Ethernet, Femtocell, and/or cordless. The processing protocols may comprise service layer protocols, IP layer protocols and link layer protocols, as specified, for example, in the Open Systems Interconnect (OSI) model. The service layer protocols may comprise secure protocols such as Secure Sockets Layer (SSL) and control protocols such as Spanning Tree Protocol (STP). The IP layer protocols may comprise IP signaling protocols such as SIP and H.323, and IP media transport protocols such as TCP, UDP, RTP, RTC and RTCP. The link layer protocols may comprise technology-specific PHY and MAC layer protocols such as, for example, Multimedia over Coax Alliance (MoCa), WiFi, Ethernet, Femtocell, and/or cordless. The network capabilities may comprise interface types, processing protocols, service types, service classes and service requirements on network side. The interface types for the identified networks may comprise technology specific broadband IP connections such as DSL, Cable, FTTx, PLC and WiMAX. The protocols may comprise service layer protocols such as SSL and STP, technology-independent IP layer protocols such as SIP, TCP, and technology-dependent IP layer protocols such as Base Station System GPRS Protocol (BSSGP).

In various exemplary embodiments of the invention, the IMRG 112 may be operable to register discovered or identified client devices and networks into a local database 112a. In this regard, the registered client devices may comprise local client devices such as the client devices 132a-132e as well as remote client devices such as the client devices 134a-134c. Information such as client device capabilities and network capabilities may also be stored in the local database 112a to support various applications or features. For example, the stored client device capabilities may be utilized to implement a local multimedia communication feature. The local multimedia communication feature may enable exchange of voice, video, and/or other forms of information among client devices of interest to support, for example, local multi-way conferences over local IP connections.

In various exemplary embodiments of the invention, the IMRG 112 may be operable to access local client devices utilizing device-dependent interfaces. In this regard, the IMRG 112 may be operable to support link layer protocols for specific PHY and MAC functionality of a particular access technology. For example, in instances where the IMRG 112 is signaled to access a Bluetooth enabled client device such as the client device 132b, the IMRG 112 may be operable to communicate information with the client device 132b utilizing Bluetooth air interface protocols.

The IMRG 112 may be operable to provide one or more common IP protocol-based interfaces towards client devices. In this regard, the IMRG 112 may be comprise a common IP layer client device interface to enable communication utilizing a wide range of client devices to, for example, a single common IP transport protocol and a single common IP signaling protocol. For example, the IMRG 112 may be operable to convert or configure different IP transport protocols utilized by the client devices 132a-132e into the single IP common transport protocol such as RTP. Different IP signaling protocols running on the client devices 132a-132e may be converted into the single common IP signaling protocol such as SIP.

The IMRG 112 may be operable to route and distribute information such as media, signaling and event packets among client devices registered to the IMRG 112. In this regard, the IMRG 112 may be operable to track registration status for client devices dynamically registered as local clients or remote clients (during roaming). The IMRG 112 may be configured to monitor and/or discover client device capabilities and network capabilities to dynamically configure registered client device based on client device capabilities and network capabilities.

The IMRG 112 may be operable to control or manage system timing and power-saving mechanisms for registered client devices. For example, the IMRG 112 may be operable to adjust system timing based on corresponding service requirements for service deployment provided by different broadband IP networks over corresponding client devices. For example, the IMRG 112 may be operable to manage power consumption on client devices based on corresponding client device capabilities and network capabilities to receive content of services offered by one or more service manager through different broadband IP networks.

The IMRG 112 may be operable to support various broadband connections such as, for example, DSL, Cable, FTTx, PLC and WiMAX. In this regard, the IMRG 112 may be operable to communicate with different broadband IP networks utilizing technology-dependent access for network access.

The IMRG 112 may be operable to dynamically configure one or more network interfaces within the IMRG 112 towards the broadband IP networks 120 for communicating with corresponding broadband IP networks. In this regard, the IMRG 112 may be configured to enable communication with different types of core networks by protocol mapping. For example, the IMRG 112 may be operable to convert a common IP media transport protocol such as RTP and a common IP signaling protocol such as SIP to different media transport and signaling protocols utilized by corresponding broadband IP networks.

The IMRG 112 may be operable to control or manage system timing and power-saving mechanisms for registered networks. For example, the IMRG 112 may be operable to adjust system timing based on corresponding service requirements for services provided by different broadband IP networks. For example, the IMRG 112 may be operable to control its own power levels and/or power consumption based on corresponding network capabilities to receive services from different broadband IP networks.

A client device such as the client device 132a may comprise suitable logic, circuitry, interfaces and/or code that are operable to receive services from different broadband IP networks through the IMRG 112. In various exemplary embodiments of the invention, the client device 132a may be operable to utilize an access technology specific interface such as Bluetooth, LTE, WiFi and/or Ethernet to communicate with the IMRG 112 for services offered by different broadband IP networks. The client device 132a may also be operable to communicate or exchange information with other client devices registered to the IMRG 112. In this regard, the client device 132a may share information with local client devices such as client devices 132b-132e as well as remote client devices such as the client devices 134a-134c. The client device 132 may be dynamically configured to receive services from the broadband IP networks 120 as well as networked client devices such as the client device 132e.

An access network such as the access network 142 may comprise suitable logic, circuitry, communication devices, interfaces and/or code that are operable to communicate services utilizing various access technologies such as, for example, IP LAN, Bluetooth, WiFi, Femtocell, LTE and WiMAX.

An IP-based application server such as the IP-based application server 150a may comprise suitable logic, circuitry, interfaces and/or code that are operable to provide IP-based services to various broadband IP networks 120. In this regard, the IP-based application server 150a may be configured to deliver carrier-grade as well as no-carrier-grade broadband access services to users through the broadband IP networks 120. The IP-based application server 150a may be operable to schedule delivery of carrier-grade services to ensure service integrity. No-carrier-grade services may be delivered when needed without reliability and stability ensured.

Although IP multimedia residential gateways (IMRGs) are illustrated in FIG. 1 for connecting client devices through a common IP layer interface to broadband IP networks via a configurable interface, the invention may not be so limited. Accordingly, other IP multimedia gateways for connecting client devices through a common IP layer interface to broadband IP networks via a configurable interface may be supported without departing from the spirit and scope of various embodiments of the invention. The IP multimedia gateways may be located in a residential location and/or non-residential locations comprising, for example, a commercial building, an office, an office complex, an apartment building and/or a factory.

In an exemplary operation, an IMRG such as the IMRG 112 may be operable to communicatively couple a plurality of client devices to the broadband IP networks 120. Client devices discovered by the IMRG 112 may be registered together with corresponding client device capabilities into the local database 112a to support applications such as a three-way local conference. The IMRG 112 may serve local client devices such as the client devices 132a-132e as well as remote client devices such as the client devices 134a-134c. Local client devices may communicate with an associated IMRG over device-dependent interfaces such as IP LAN, Bluetooth, WiFi, Femtocell, LTE and WiMAX. Remote client devices may exchange or communicate information with an associated IMRG over device-independent interfaces such as, for example, the broadband IP networks 120. A client device such as the client device 132a may initially register as a local client device and become a remote client device to the IMRG 112 when the client device 132a roams outside of a local coverage area served by the IMRG 112. Similarly, a client device such as the client device 134a may initially register on the IMRG 112 as a remote client device. In instances where the client device 134a moves into the local coverage area of the IMRG 112, the remote client device may be registered as a local client device.

The IMRG 112 may be operable to track registration status and capabilities for registered client devices, and capabilities of networks available. In this regard, the IMRG 112 may be operable to dynamically configure associated client devices to share resources by, for example, routing and distributing content among associated client devices. In this regard, the IMRG 112 may be operable to perform media or content transcoding to fit the needs of different client devices. The IMRG 112 may adapt to a wide range of client devices to the broadband IP networks by providing a common IP protocol-based interface. In this regard, the IMRG 112 may be operable to utilize a single IP transport protocol and a single IP signaling protocol to interface with client device with different IP protocol components. The IMRG 112 may be operable to access the broadband IP networks utilizing various broadband access technologies such as DSL, Cable, FTTx, PLC and WiMAX. The IMRG 112 may be operable to dynamically configure one or more network interfaces within the IMRG 112 towards to the broadband IP networks 120 to enable communication between the IMRG 112 and the broadband IP networks. The IMRG 112 may be operable to manage various aspects of communications between client devices and various broadband IP networks by, for example, adjusting system timing and/or performing power-saving control.

Figure 2:
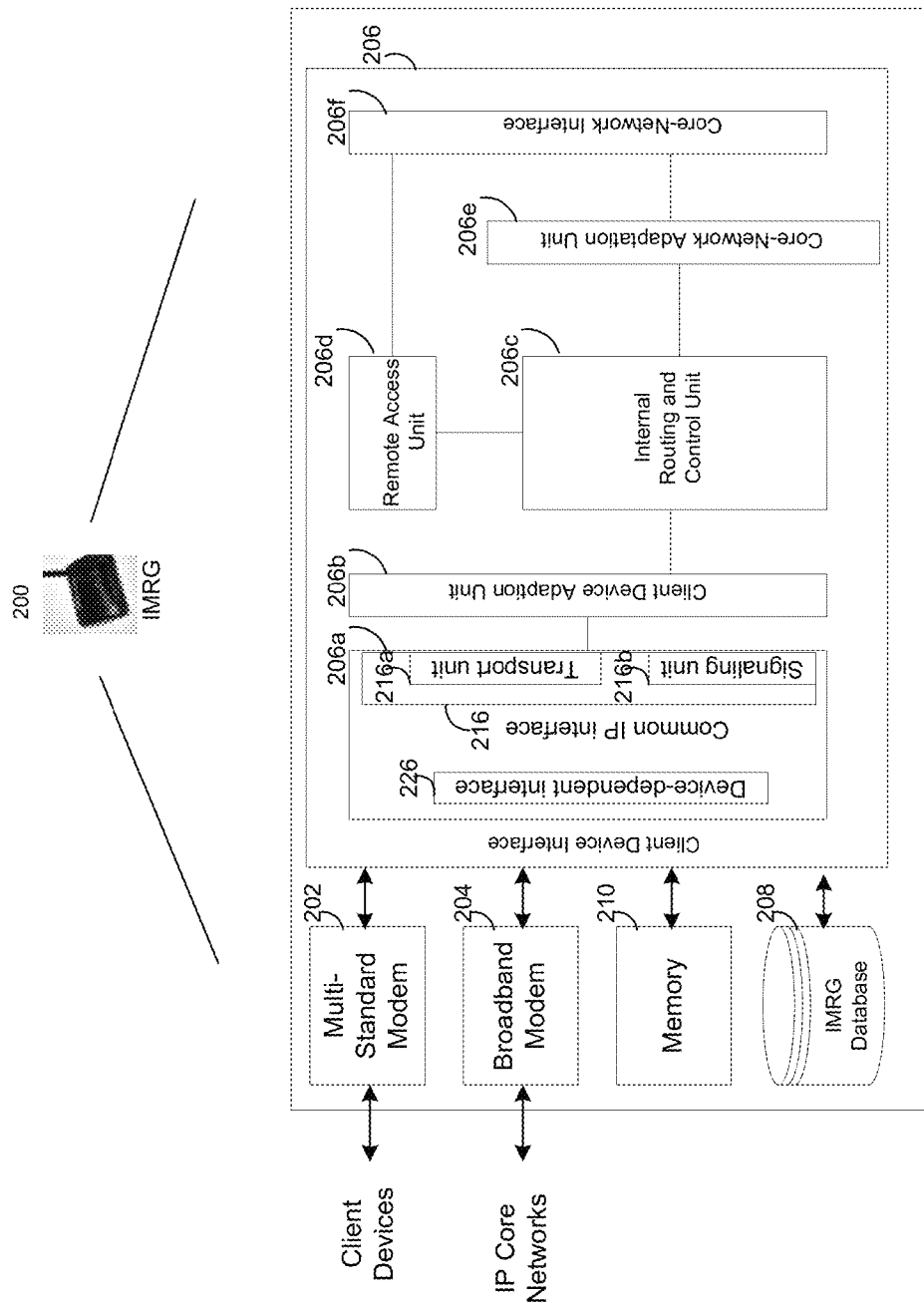
FIG. 2 is a diagram illustrating an exemplary generic IP multimedia residential gateway (IMRG) that seamlessly facilitates protocol mapping and media transcoding between IP core networks and client devices, in accordance with an embodiment of the invention.

FIG. 2 is a diagram illustrating an exemplary generic IP multimedia residential gateway (IMRG) that seamlessly facilitates protocol mapping and media transcoding between IP core networks and client devices, in accordance with an embodiment of the invention. Referring to FIG. 2, there is shown an IP multimedia residential gateway (IMRG) 200 comprising a multi-standard modem 202, a broadband modem 204, an IMRG processor 206, an IMRG database 208 and a memory 210.

The multi-standard modem 202 may comprise suitable logic, circuitry, interfaces and/or code that are operable to communicate with a plurality of client devices such as the client devices 132a-132e and 134a-134c utilizing a device-dependent interface such as, for example, Ethernet, Wi-Fi, Bluetooth, cordless, and/or Femtocell.

The broadband modem 204 may comprise suitable logic, circuitry, interfaces and/or code that are operable to transmit voice and/or data in adherence with one or more internet protocol (IP) broadband standard. The broadband modem 204 may be operable to transmit and/or receive voice and/or data to and/or from the broadband IP networks 120 over broadband connections such as, for example, T1/E1 line, DSL, Cable, FTTx, PLC and WiMAX. The broadband modem 204 may dynamically configure one or more network interfaces utilized within the broadband modem 204 towards to the broadband IP networks 120. For example, in instances where the broadband modem 204 is signaled to exchange information with the VoIP softswitch network 126, the broadband modem 204 may be configured to utilize FTTx as an access solution to the VoIP softswitch network 126.

The IMRG processor 206 may comprise suitable logic, circuitry, interfaces and/or code that are operable to perform a variety of signal processing tasks to maintain or manage communication between associated client devices and the broadband IP networks 120, and/or among associated client devices. The IMRG processor 206 may comprise a client device interface 206a, a client device adaptation unit 206b, an internal routing and control unit 206c, a remote access unit 206d, a core-network adaptation unit 206e and a core-network interface 206f.

The client device interface 206a may comprise suitable logic, circuitry, interfaces and/or code that are operable to perform protocol conversion for client device access. The client device interface 206a may comprise a device-dependent interface 226 and a common IP interface 216. The device-dependent interface 226 may comprise suitable logic, circuitry, interfaces and/or code that are operable to access local client devices over device-dependent connections such as WiFi and LTE connections. The device-dependent interface 226 may be operable to support link layer protocols for specific PHY and MAC functionality of a particular access technology. For example, in instances where the client device interface 206a is signaled to access a WiFi enabled client device such as the client device 132c, the client device interface 206a may exchange information with the client device 132c utilizing WiFi air interface protocols for corresponding link layer communication. The device-dependent interface 226 may support different IP transport and/or signaling components utilized by client devices. The common IP interface 216 may comprise suitable logic, circuitry, interfaces and/or code that are operable to provide a common IP support to communicate content between various client devices and the broadband IP networks 120. The common IP interface 216 may comprise a transport unit 216a and a signaling unit 216b. The transport unit 216a may comprise suitable logic, circuitry, interfaces and/or code that are operable to provide a single IP transport component such as RTP to support data communication over IP. The signaling unit 216b may comprise suitable logic, circuitry, interfaces and/or code that are operable to provide a single IP signaling component such as SIP to support signaling communication over IP. The client device interface 206a may perform protocol mapping or translation between different IP transport and/or signaling components utilized by client devices and the common IP-based interface 216 running on the IMRG processor 206.

The client device adaptation unit 206b may comprise suitable logic, circuitry, interfaces and/or code that are operable to adapt a wide range of client devices. In this regard, the client device adaptation unit 206b may be operable to perform, for example, media or content transcoding, rate conversion, system timing adjustment and/or power control based on corresponding client device capabilities to improve user experiences.

The internal routing and control unit 206c may comprise suitable logic, circuitry, interfaces and/or code that are operable to route and distribute media, signaling and event packets among client devices registered to the IMRG 112, for example. In this regard, the internal routing and control unit 206c may be operable to keep tracking registration status for associated client devices. In instances where a client device such as the client device 132a is within a local client area served by the IMRG 112, the internal routing and control unit 206c may be operable to register the client device 132a in the IMRG database 208 as a local client device of the IMRG 112. In instances where a local client device such as the client device 134a roams outside of the local coverage area, the internal routing and control unit 206c may register the client device 134a in the IMRG database 208 as a remote client device for the IMRG 112. The internal routing and control unit 206c may collect or track client device capabilities for associated client devices and network capabilities to build the IMRG database 208. The internal routing and control unit 206c may be operable to dynamically configure associated client devices based on collected system capability information. In addition, the internal routing and control unit 206c may be operable to coordinate or control system timing adjustment and power control management for delivery of service.

The remote access unit 206d may comprise suitable logic, circuitry, interfaces and/or code that are operable to provide necessary functionality for the support of remote access by client devices that are roaming outside of a local coverage of the IMRG 112. In this regard, the remote access unit 206d may be operable to exchange information with remote client devices over broadband connections to the broadband IP networks 120.

The core-network adaptation unit 206e may comprise suitable logic, circuitry, interfaces and/or code that are operable to provide adaptation to different broadband IP networks for various client devices. In this regard, the core-network adaptation unit 206e may perform, for example, protocol translation and mapping between a common IP protocol utilized by the IMRG 200 and protocols used by different broadband IP networks.

The core-network interface 206f may comprise suitable logic, circuitry, interfaces and/or code that are operable to provide various broadband connections such as, for example, DSL, Cable, FTTx, PLC and WiMAX for access to the broadband IP networks 120.

The IMRG database 208 may comprise suitable logic, circuitry, interfaces and/or code that are operable to store and manage client device information and network information. In this regard, the IMRG database 208 may comprise registration status information for associated client devices. The registration status for a client device pertaining to the IMRG 200 may be a local client device or a remote client device. The IMRG database 208 may be operable to keep tracking or collecting client device and network capabilities. The collected capability information may be utilized to dynamically configure client devices pertaining to the IMRG 200. The IMRG database 208 may comprise RAM, ROM, low latency nonvolatile memory such as flash memory and/or other suitable electronic data storage capable of storing data and instructions The memory 210 may comprise suitable logic, circuitry, interfaces and/or code that are operable to store and manage data and/or other information utilized by the IMRG processor 206. For example, the memory 210 may be utilized to store processed data or content generated by the IMRG processor 206. The memory 210 may be enabled to store executable instructions to process, for example, protocol mapping and/or media transcoding. The memory 210 may comprise RAM, ROM, low latency nonvolatile memory such as flash memory and/or other suitable electronic data storage capable of storing data and instructions.

In an exemplary operation, an IMRG such as the IMRG 200 may provide connections for various client devices to the broadband IP networks 120. The IMRG 200 may be operable to register client devices discovered into the IMRG database 208 to support applications such as a local telephony. Client devices discovered inside and outside of a local client area may be registered as local client devices and remote client devices, respectively. The IMRG processor 206 may be operable to communicate with local client devices utilizing the device-dependent interface 226 within the client device interface 206a. The IMRG processor 206 may be operable to track registration status and device capabilities for registered client devices to dynamically perform client device configuration. The internal routing and control unit 206c may be operable to route and distribute content among client devices. In this regard, the IMRG processor 206 may utilize the common IP interface 216 to provide a common IP support for communication between various client devices and the broadband IP networks 120. In addition, media transcoding may be performed by the client device adaption unit 206b to fit the needs of different client devices. The IMRG processor 206 may be operable to connect a wide range of client devices to the broadband IP networks through the core-network adaptation unit 206e and the core-network interface 206f. The IMRG processor 206 may be operable to access, via the broadband modem 204, the broadband IP networks utilizing various broadband access technologies such as DSL, Cable, FTTx, PLC and WiMAX supported by the core-network interface 206f. The core-network interface 206f may be dynamically configured for access to the broadband IP networks 120. The internal routing and control unit 206c may adjust system timing and/or perform power-saving control to manage various aspects of communications between client devices and the broadband IP networks 120.

Figure 3:
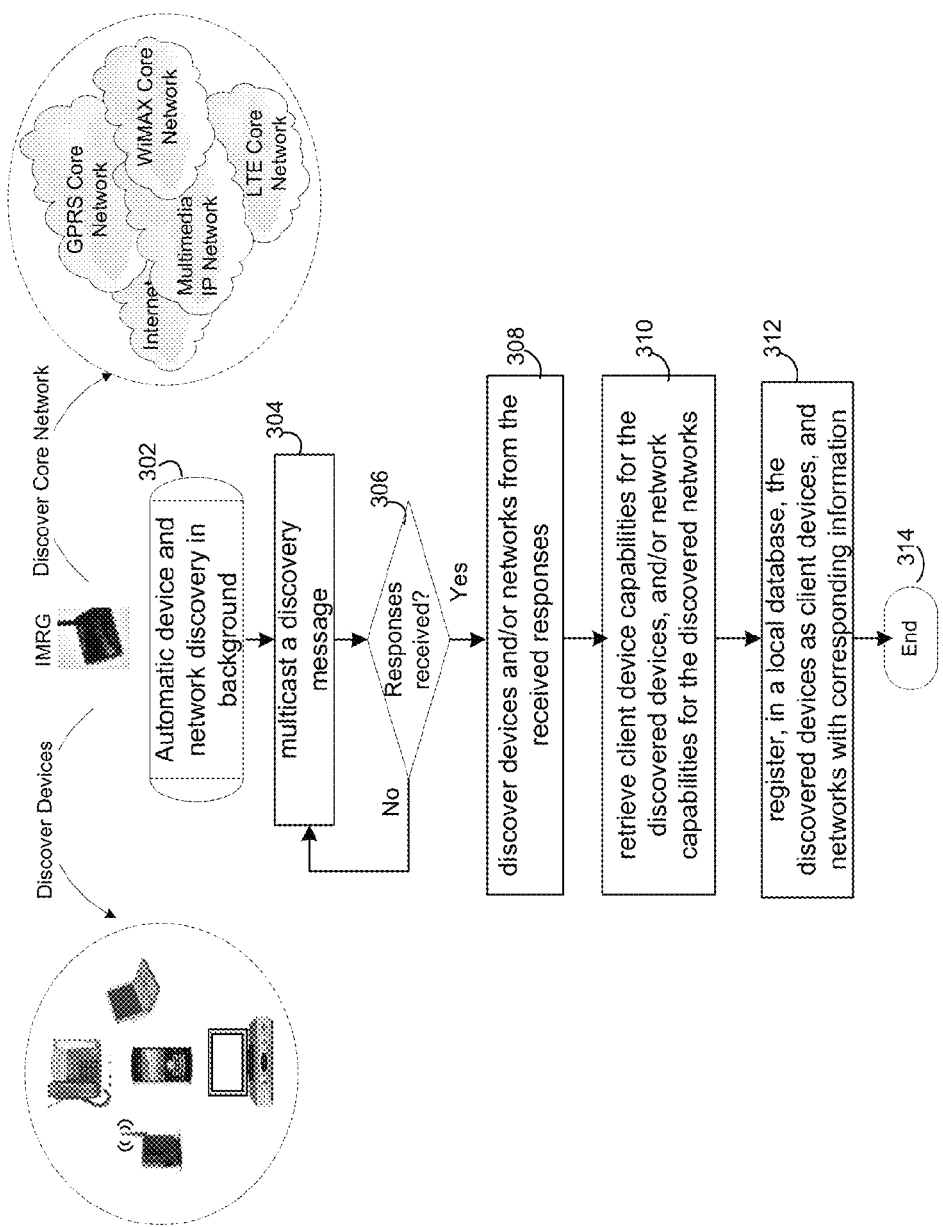
FIG. 3 is a block diagram illustrating exemplary steps that may be performed by a generic IP multimedia residential gateway (IMRG) for automatic device and network discovery, in accordance with an embodiment of the invention.

FIG. 3 is a block diagram illustrating exemplary steps that may be performed by a generic IP multimedia residential gateway (IMRG) for automatic device and network discovery, in accordance with an embodiment of the invention. Referring to FIG. 3, the exemplary steps may start with step 302. In step 302, an IMRG such as the IMRG 112 may be configured to perform automatic device and network discovery in background. In step 304, the IMRG 112 may be operable to multicast a discovery message. In step 306, the IMRG 112 may wait for responses to the discovery message. In instances where the IMRG 112 may receive response from communication devices and/or networks, then in step 308, the IMRG 112 may be operable to discover or identify client devices and/or broadband IP networks based on information provided in the received responses. In step 310, the IMRG 112 may be operable to retrieve client device capabilities for the discovered devices, and/or network capabilities for the discovered networks. In step 312, the IMRG 112 may be operable to register, into the IMRG database 208, the discovered devices as client devices, and networks with corresponding capability information. The exemplary steps may end in step 314.

In step 306, in instances where the IMRG 112 may not receive response from communication devices and/or networks, then the exemplary steps may return to step 304.

Figure 4:
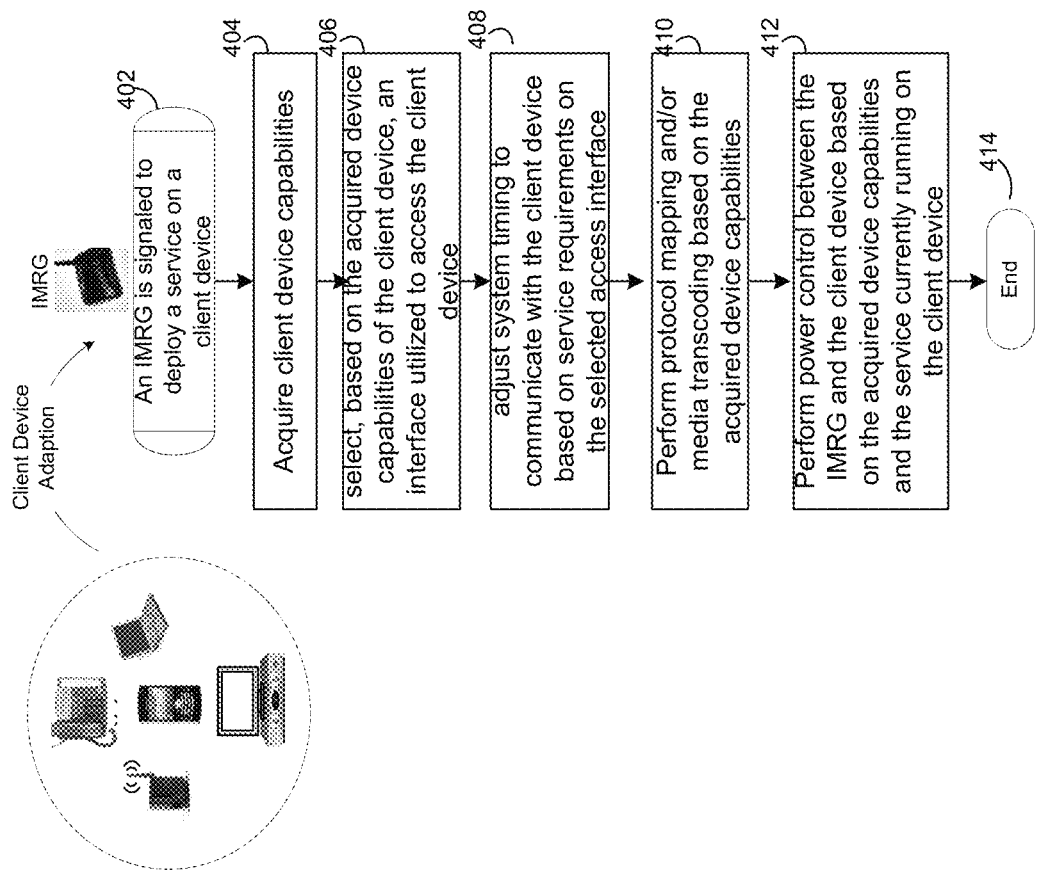
FIG. 4 is a block diagram illustrating exemplary steps that may be performed by a generic IP multimedia residential gateway (IMRG) to perform client device adaptation, in accordance with an embodiment of the invention.

FIG. 4 is a block diagram illustrating exemplary steps that may be performed by a generic IP multimedia residential gateway (IMRG) to perform client device adaptation, in accordance with an embodiment of the invention. Referring to FIG. 4, the exemplary steps start with step 402. In step 402, an IMRG such as the IMRG 200 is signaled to deploy a service on a client device such as the client device 132a. In step 404, the IMRG 200 may be operable to acquire client device capabilities from the IMRG database 208, for example. In step 406, the client device interface 206a may be configured to select, based on the acquired device capabilities of the client device 132a, an interface such as Bluetooth to access the client device 132a. In step 408, the internal routing and control unit 206c may be operable to adjust system timing to communicate information with the client device 132a based on service requirements on the selected access interface. In step 410, the client device interface 206a and the client device adaptation unit 206b may be operable to perform protocol mapping and media transcoding, respectively, based on the acquired device capabilities for client device adaptation. In step 412, the internal routing and control unit 206c may be operable to perform power control between the IMRG 200 and the client device 132a based on the acquired device capabilities and the service currently running on the client device 132a. The exemplary steps may return to step 414.

Figure 5:
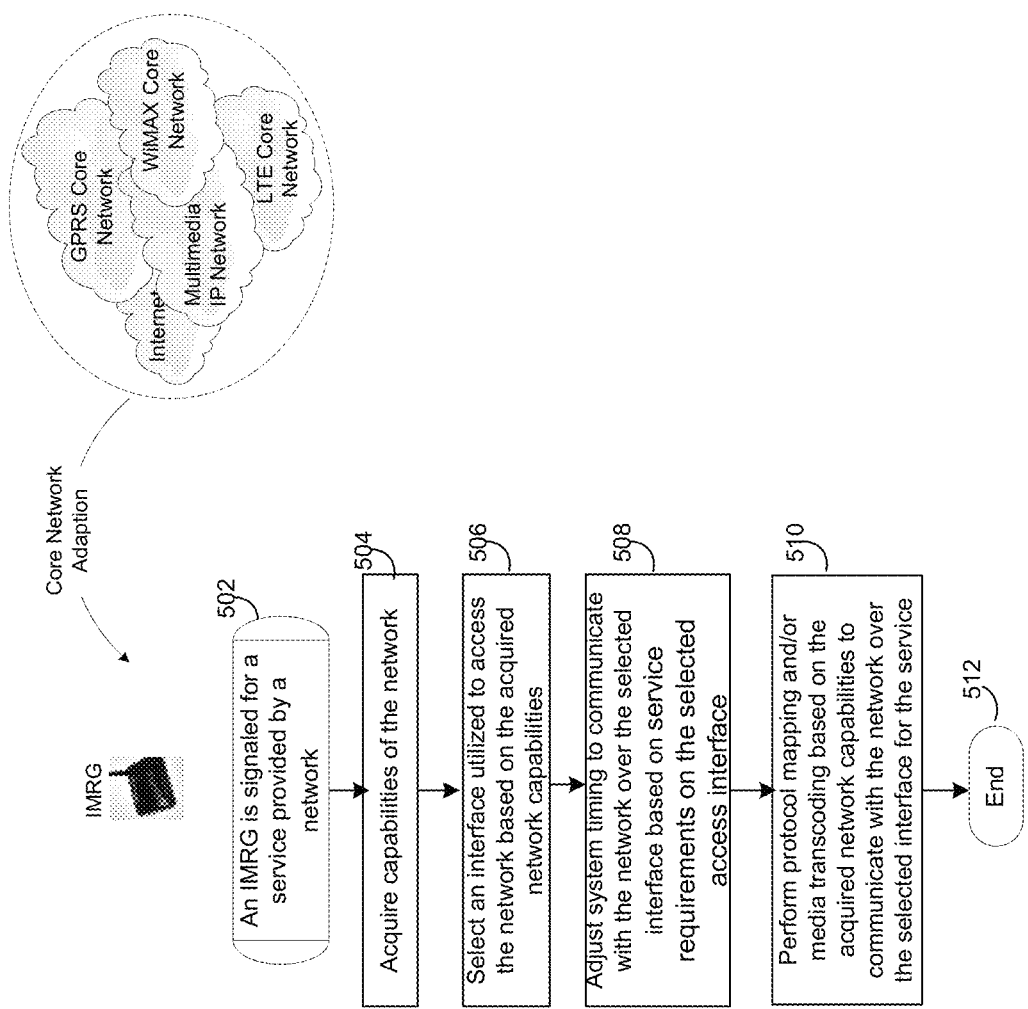
FIG. 5 is a block diagram illustrating exemplary steps that may be performed by a generic IP multimedia residential gateway (IMRG) to perform network adaptation, in accordance with an embodiment of the invention.

FIG. 5 is a block diagram illustrating exemplary steps that may be performed by a generic IP multimedia residential gateway (IMRG) to perform network adaptation, in accordance with an embodiment of the invention. Referring to FIG. 5, the exemplary steps start with step 502. In step 502, an IMRG such as the IMRG 200 is signaled for a service provided by a broadband IP network such as the VoIP softswitch network 126. In step 504, the IMRG 200 may be operable to acquire network capabilities from the IMRG database 208, for example. In step 506, the core-network interface 206f may be configured to select, based on the acquired network capabilities of the VoIP softswitch network 126, a broadband access technology such as FTTx for access to the VoIP softswitch network 126 form the IMRG 200. In step 508, the internal routing and control unit 206c may be operable to adjust system timing to communicate information with the VoIP softswitch network 126 based on corresponding service requirements on the selected broadband access technology. In step 510, the core-network adaptation unit 206e may be operable to perform protocol mapping and/or media transcoding based on the acquired network capabilities for network adaptation. The exemplary steps may return to step 512.

Figure 6:
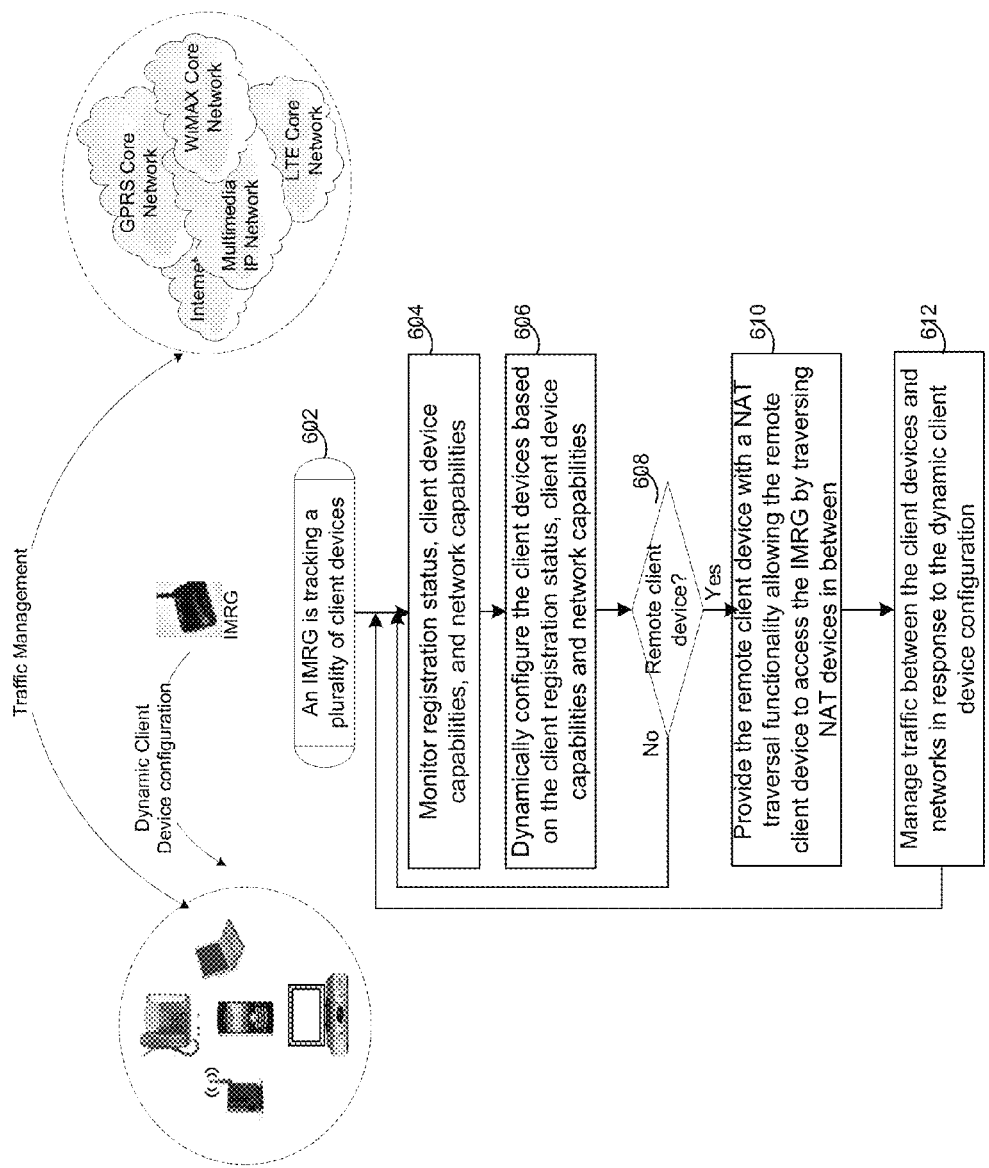
FIG. 6 is a block diagram illustrating exemplary steps that may be performed by a generic IP multimedia residential gateway (IMRG) for dynamic device configuration, in accordance with an embodiment of the invention.

FIG. 6 is a block diagram illustrating exemplary steps that may be performed by a generic IP multimedia residential gateway (IMRG) for dynamic device configuration, in accordance with an embodiment of the invention. Referring to FIG. 6, the exemplary steps start with step 602. In step 602, an IMRG such as the MRG 112 may be operable to track a plurality of client devices. In step 604, the IMRG 112 may be operable to monitor and/or collect information on client device registration status, client device capabilities, and network capabilities to build the IMRG database 208. In step 606, the IMRG 112 may utilize information stored in the IMRG database 208 to dynamically configure corresponding client devices based on information on the client registration status, client device capabilities and network capabilities. In step 608 it may be determined whether a remote client device identified. In instances where a client device such as the client device 132a is discovered or identified, then in step 610, the IMRG 112 may be operable to provide the remote client device with a NAT traversal functionality allowing the remote client device to access the IMRG 112 by traversing NAT devices in between. In step 612, the IMRG 112 may be operable to manage traffic between the client devices and networks in response to the dynamic client device configuration. The exemplary steps may return to step 604.

In step 608 in instances where a client device such as the client device 132a is not discovered or identified, then exemplary steps may return to step 604.

Figure 7:
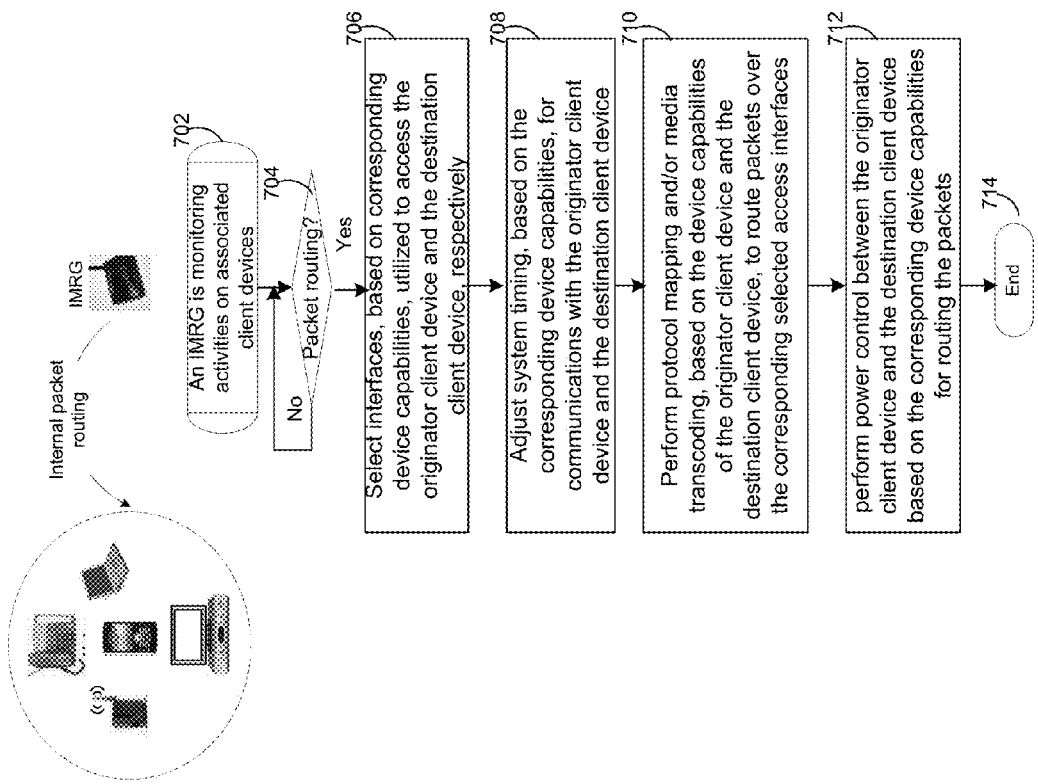
FIG. 7 is a block diagram illustrating exemplary steps that may be performed by a generic IP multimedia residential gateway (IMRG) to manage internal packet routing, in accordance with an embodiment of the invention.

FIG. 7 is a block diagram illustrating exemplary steps that may be performed by a generic IP multimedia residential gateway (IMRG) to manage internal packet routing, in accordance with an embodiment of the invention. Referring to FIG. 7, the exemplary steps start with step 702. In step 702, an IMRG such as the IMRG 200 is monitoring activities on associated client devices such as the client devices 132a-132e and 134a-134c. In step 704, it may be determined whether packet routing is expected among the client devices associated with the IMRG 200. In instances where packet routing among associated client devices is expected, then in step 706, the IMRG 200 may be operable to select interfaces, based on corresponding device capabilities, for access the originator client device such as the client device 132a and the destination client device such as the client device 134e, respectively.

In step 708, the internal routing and control unit 206c may be operable to adjust system timing, based on the corresponding device capabilities, for communications with the client device 132a and the client device 134e. In step 710, the client device interface 206a and the client device adaptation unit 206b may be operable to perform protocol mapping and media transcoding, respectively, based on the device capabilities of the client device 132a and the client device 134e, to route or distribute packets over the corresponding selected access interfaces. In step 712, the internal routing and control unit 206c may be operable to perform power control between the client device 132a and the client device 134e according to the corresponding device capabilities for routing the packets. The exemplary steps may end in step 714.

In step 704, in instances where packet routing among associated client devices is not expected, then the exemplary steps may stay in step 704.

In various exemplary aspects of the method and system for generic IP multimedia residential gateways, an IP multimedia gateway such as the IMRG 112 may be operable to connect a plurality of client devices such as the local client devices 132a-132e and the remote client devices 134a-134c to a single common IP transport component such as RTP and a single common IP signaling component such as SIP. The IMRG 112 may be configured to communicate with various broadband IP networks such as the Internet 122, the VoIP softswitch network 126 and the LTE core network 128. The IMRG 112 may be operable to communicate traffic of services that are provided by the broadband IP networks 120 to client devices. The IMRG 112 may be operable to automatically perform device and network discovery. Device capabilities and network capabilities may be determined during the device and network discovery. In this regard, the client device adaptation unit 206b may be operable to perform protocol translation and/or media transcoding based on the determined device capabilities and the determined network capabilities.

The IMRG 112 may be operable to dynamically configure the client devices based on the determined device capabilities and the determined network capabilities. The internal routing and control unit 206c may be operable to adjust system timing and perform power control to deploy services provided by different broadband IP networks over corresponding client devices. Information such as media, signaling and event packets may be routed or distributed by the IMRG 112 among associated client devices when needed.

In various exemplary aspects of the method and system for generic IP multimedia residential gateways, an IP multimedia gateway such as the IMRG 112 may be operable to determine device capabilities such as device service processing capabilities of one or more of a plurality of communication devices such as the local client devices 132a-132e and the remote client devices 134a-134c. A common IP layer client device interface such as the common IP interface 216 within the client device interface 206a for the one or more of the plurality of client devices may be configured based on the determined device capabilities. For example, the IMRG 112 may be configured to communicate with the one or more of the plurality of client devices utilizing the device-dependent interface 226 and the common IP interface 216, the latter of which is operable to handle a plurality of different link layer protocols utilized by the one or more of the plurality of client devices for services. The common IP interface 216 may be operable to provide a single common IP transport component such as RTP and a single common IP signaling component such as SIP via the transport unit 216a and the signaling unit 216b, respectively.

The IMRG 112 may be operable to configure one or more network interfaces utilized within the IMRG 112 to enable communication between the IMRG 112 and one or more communication networks such as the Internet 122, the VoIP softswitch network 126 and the LTE core network 128 based on the determined device capabilities. The IMRG 112 may be operable to utilize the common IP layer client device interface and the configured one or more network interfaces to communicate content for various services, for example broadband services, between the one or more of the plurality of client devices and one or more service managers. The IMRG 112 may be operable to determine network capabilities of the one or more broadband IP networks during the device and network discovery. In this regard, the client device adaptation unit 206b may be operable to perform protocol translation and/or content transcoding based on the determined device capabilities and the determined network capabilities. The IMRG 112 may be operable to dynamically configure the client devices based on the determined device capabilities and the determined network capabilities. The internal routing and control unit 206c may be operable to adjust system timing and perform power control to communicate or deploy services provided by different broadband IP networks over corresponding client devices. Information such as media, signaling and event packets may be routed or distributed by the IMRG 112 among associated client devices when needed.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for generic IP multimedia residential gateways.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
    performing a device discovery to identify a first communication device and a first device capability of the first communication device, and to identify a second communication device and a second device capability of the second communication device, the first communication device being associated with a first link layer protocol, the second communication device being associated with a second link layer protocol;
    configuring an interface in a network device to enable communication between the network device, the first communication device, and the second communication device, wherein the interface is configured to handle the first link layer protocol and the second link layer protocol;
    configuring a network interface of the network device to enable communication between the network device and a service manager via a communication network;
    performing protocol translation, content transcoding and/or dynamic device configuration based at least in part on one or more of the first device capability, the second device capability or a network capability of the communication network; and
    communicating content between the service manager and at least one of the first communication device or the second communication device by utilizing the interface and the network interface.

2. The method according to claim 1, comprising performing the content transcoding based at least in part on one or more of the first device capability or the network capability of the communication network.

3. The method according to claim 1, comprising adjusting a system timing based at least in part on one or more of the first device capability or the network capability of the communication network.

4. The method according to claim 3, comprising communicating the content with at least one of the first communication device or the second communication device utilizing the system timing.

5. The method according to claim 1, comprising determining a power level for the network device based at least in part on one or more of the first device capability or the network capability of the communication network.

6. The method according to claim 5, comprising communicating the content with the first communication device utilizing the power level.

7. A network device, comprising:
circuitry configured to determine a first device capability of a first communication device;
circuitry configured to determine a second device capability of a second communication device;
circuitry configured to store the first device capability and the second device capability in a local database associated with the network device
circuitry configured to configure an interface based on the first device capability and the second device capability, wherein the interface is configured to handle a plurality of different link layer protocols that is associated with the first communication device and the second communication device;
circuitry configured to configure a network interface to enable communication between said network device and a service manager via a communication network based on the first device capability and the second device capability;
circuitry configured to perform protocol translation, content transcoding and/or dynamic device configuration based at least in part on one or more of the first device capability, the second device capability or a network capability of said communication network; and
circuitry configured to communicate content between the service manager and at least one of the first communication device or the second communication device by utilizing the interface and the network interface.

8. The network device according to claim 7, wherein the first device capability specifies a first transport protocol, wherein the second device capability specifies a second transport protocol, wherein the circuitry configured to configure the interface comprises circuitry configured to convert the first transport protocol and the second transport protocol into a common transport protocol.

9. The network device according to claim 7, wherein the first device capability specifies a first signaling protocol, wherein the second device capability specifies a second signaling protocol, wherein circuitry configured to configure the interface comprises circuitry configured to convert the first signaling protocol and the second signaling protocol into a common signaling protocol.

10. The network device according to claim 7, comprising circuitry configured to perform protocol mapping based on at least the first device capability or the second device capability.

11. The network device according to claim 7, comprising a client device adaption unit configured to transcode the content based on at least one of the first device capability or the second device capability.

12. The network device according to claim 7, comprising:
circuitry configured to determine the network capability of the communication network and to store the network capability in the local database; and
circuitry configured to configure the first communication device based on the network capability by performing at least one of a power control or a system timing adjustment.

13. A system, comprising:
a network device, the network device being configured to:
identify a first device capability of a first communication device, the first device capability specifying a first protocol;
identify a second device capability of a second communication device, the second device capability specifying a second protocol;
store the first device capability and the second device capability in a local database that is accessible to the network device;
configure an interface in the network device by converting the first protocol and the second protocol into a common protocol;
configure a network interface to enable communication between the network device and a service manager via a communication network;
perform protocol translation, content transcoding and/or dynamic device configuration based at least in part on one or more of the first device capability, the second device capability or a network capability of the communication network; and
distribute content from the service manager to at least one of the first communication device or the second communication device via the interface and the network interface.

14. The system according to claim 13, wherein the common protocol comprises a single common transport protocol for the first communication device and the second communication device.

15. The system according to claim 13, wherein the common protocol comprises a single common signaling protocol for the first communication device and the second communication device.

16. The system according to claim 13, wherein the network device comprises a client device adaption unit configured to transcode the content based on at least one of the first device capability or the second device capability.

17. The system according to claim 13, wherein the first communication device is configured to communicate with the second communication device via the interface.

18. The system according to claim 13, wherein the interface is configured to handle a plurality of different link layer protocols that is associated with the first communication device and the second communication device.

\* \* \* \* \*